United States Patent
Barlow, Jr.

[15] 3,646,560
[45] Feb. 29, 1972

[54] TWO-TERMINAL CONTROL CIRCUIT AND POWER SUPPLY

[72] Inventor: Edson L. Barlow, Jr., Oakland Township, Mich.

[73] Assignee: Multi-Elmac Company, Oak Park, Mich.

[22] Filed: Mar. 5, 1970

[21] Appl. No.: 16,862

[52] U.S. Cl.............................343/228, 325/392, 317/147, 340/171, 318/16
[51] Int. Cl..................................H04b 7/00, H04b 1/06
[58] Field of Search.................343/225, 228; 325/37, 392, 325/393, 390; 317/147; 340/171; 318/16

[56] References Cited

UNITED STATES PATENTS

| | | | |
|---|---|---|---|
| 2,923,862 | 2/1960 | Teich | 343/225 |
| 3,041,507 | 6/1962 | Rose et al. | 343/225 |
| 3,050,661 | 8/1962 | Jenkins | 343/225 |
| 3,378,775 | 4/1968 | Joseph | 325/392 |

Primary Examiner—Robert L. Richardson
Assistant Examiner—John C. Martin
Attorney—Benjamin W. Colman

[57] ABSTRACT

Automatically operating electrical devices or equipment are operatively controlled by a radio control receiver circuit connected to an operating output circuit, provided with or without a manually operated switch, to actuate such devices or equipment. Current furnished by a constant power supply is controlled by the receiver circuit to substantially continuously power both the radio receiver and an operating output relay for actuating any such device or equipment.

3 Claims, 3 Drawing Figures

PATENTED FEB 29 1972

3,646,560

INVENTOR.
EDSON L. BARLOW, JR

BY Benjamin W. Colman

ATTORNEY

TWO-TERMINAL CONTROL CIRCUIT AND POWER SUPPLY

The invention relates to a two-terminal control circuit and power supply system providing a substantially continuous current supply to a radio control receiver and to an electrical operating relay. A voltage regulator circuit is provided in the system that must be satisfied before a silicon control rectifier will operate and pass voltage to the relay. Voltage is supplied according to a sine wave curve, a relatively small leading portion of portion of each half-wave being supplied to the receiver while the remaining portion of each half-wave is supplied to the operating relay. Thus, there is practically no variation in time in the flow of current to the radio receiver and the relay, resulting in substantially continuous simultaneous powering of both, thus avoiding some of the problems heretofore present in currents supplied by intermittent, momentary, temporary pulses of voltage, as for instance in the momentary discharge of voltage by capacitors.

The advantages of the inventive circuitry and system disclosed herein reside in having a substantially continuous voltage supply furnished simultaneously to the radio control receiver and to the operating relay, utilizing a voltage regulator in the circuit which must be satisfied before the silicon control rectifier will operate, and using an all-solid-state circuitry to provide the required substantially continuous flow of current.

The circuitry of this disclosure is utilized in and particularly adapted to garage door operating systems. But any electrically operated device such as an appliance, a machine motor, a piece of electrical equipment, or other device that can be radio controlled comes within the compass of the invention.

These and additional objects and advantages of the invention and features of construction will become more clearly apparent from the following description taken in conjunction with the accompanying drawings, in which FIG. 1 is an illustration of a wiring diagram of one control circuit arrangement embodying the invention.

Figure 1:
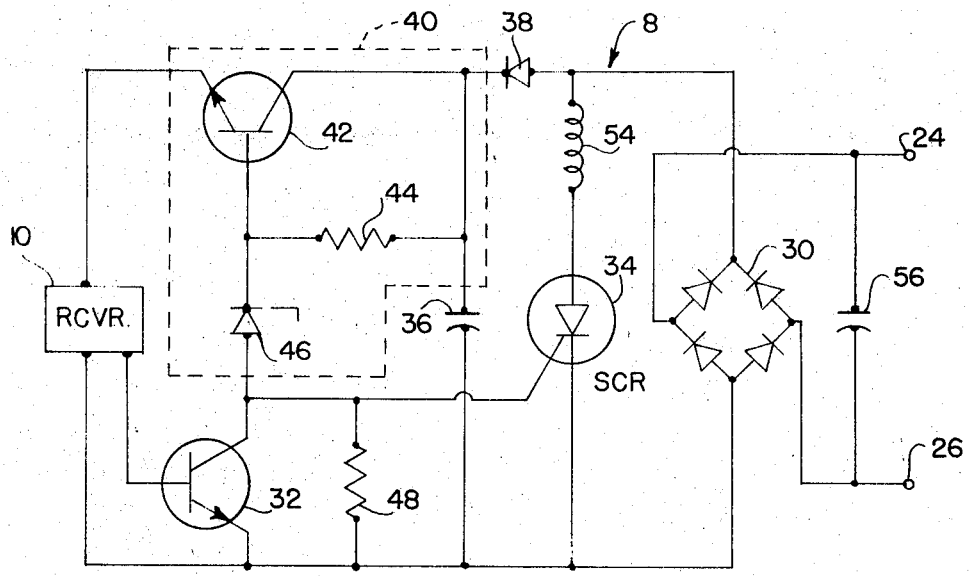
Figure 2:
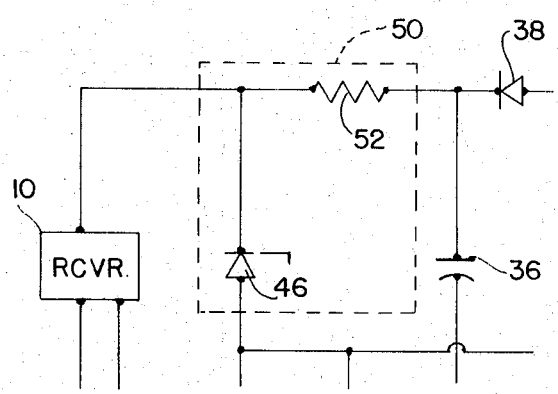
FIG. 2 is an illustration of an alternate version of a portion of the diagram illustrated in FIG. 1, embodying a shunt-type voltage regulator.
Figure 3:
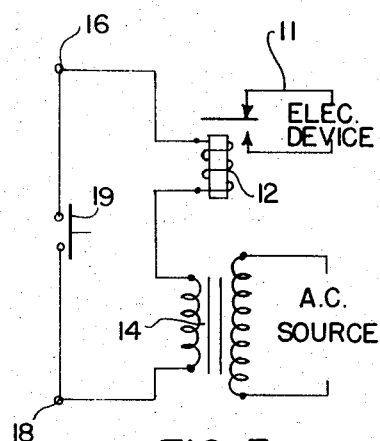
FIG. 3 is an illustration of transformer and relay circuit adapted to be used in an electrical operator for a garage door opener or other device.

The two-terminal control circuit 8 illustrated in FIG. 1 has been developed as a means for using only two wires or conductors to serve the dual function of supplying electric current to a radio-controlled receiver 10 and to an operating relay 12 for actuation of a piece of electrical apparatus such as a garage door opener or other device 11 (FIG. 3). Typically, a garage door opener or other electrically powered appliance, machine or device 11 responsive to an actuating relay 12, usually in conjunction with a low-voltage transformer 14 (FIG. 3), is served by alternating current of conventional 110/117 voltage, to perform a desired operating or output function. The operating circuit including a transformer and relay is usually embodied in the operating device and is provided with two terminals 16 and 18. A manually operable normally open switch 19 can be directly connected across the terminals (FIG. 3) to close the circuit to and operate the relay 12. It is to be understood that the control circuitry of FIGS. 1 and 2 is adapted and designed for application to an operating circuit similar to that illustrated in FIG. 3 without a pushbutton switch 19 applied thereto across terminals 16 and 18.

When the radio control receiver 10 is used to control an electrically powered garage door opener, appliance or piece of machinery by means of a remote transmitter (not illustrated), it is common practice in the art to use a small pilot relay in the receiver to actuate the motor-controlling relay 12. Such a pilot relay is directly connected to the motor control of the garage door operator, appliance or machine, by two current-carrying conductors, with at least one additional conductor required to furnish electric power to the receiver 10. The circuitry 8 of this invention eliminates the requirement for such an additional wire or conductor, providing advantageous means for simplifying the application of a radio control receiver in the circuitry of an electrically operated two-wire manually controlled system. Thus, the control circuitry 8 and the radio receiver 10 are direct-connected to the terminals 16 and 18 without any additional wiring, simplifying and reducing the installation cost of the control equipment.

A circuit having two-wire operation and using the two half-cycles of alternating current available from a transformer through an operating relay has been previously developed. This earlier system utilized one half-cycle to power the radio receiver and the other half-cycle to actuate the operating relay. When the relay was selectively designed to perform properly on half-wave rectified current, the circuitry operated fairly well. But many relays are designed to operate on full-wave alternating current and the resultant application of such circuitry and control was a chattering, intermittent and improper operation of the relay on half-wave current. Inasmuch as control circuitry must be designed for application not only to new installations where the operating relay can be selected as required for a particular circuitry, but also must be adaptable to previously installed systems having any variation in the many types of actuating relays, the application of the previously-developed circuitry is relatively limited.

The herein disclosed two-wire control circuit 8 of FIGS. 1 and 2 overcome the limitations and problems encountered with such previously designed half-wave circuitry by providing practically all of the alternating current to the operating relay 12, only a very small portion of each half-cycle being diverted therefrom to power the radio receiver 10.

Terminals 24 and 26 in the wiring diagram illustrated in FIG. 1 are directly connected to the terminals 16 and 18 of the circuit illustrated in FIG. 3, without observing polarity conditions. If the manually operated switch 19 is present (and it may be optionally omitted) in the operating circuitry illustrated in FIG. 3, the connection of terminals 16 and 18 to the control circuit terminals 24 and 26 (FIG. 1) fulfills all of the connection requirements for powering the circuit 8 and the radio receiver 10. By such connections, transformer 14 supplies voltage and current to the operating relay 12 and to the radio receiver 10 simultaneously.

When no signal is being received by the receiver 10 from the remote transmitter or other signal source, transistor 32 is normally turned on, which passes a low impedance to the gate of the silicon-controlled rectifier 34, thereby keeping the rectifier 34 turned off. Under such conditions, the output of the bridge rectifier 30 charges the capacitor 36 through diode 38. The power available across capacitor 36 is voltage regulated by the series regulator circuit 40 consisting of the transistor 42, resistor 44, and the zener diode 46 connected to the receiver 10 and the capacitor 36. As a result of the application of voltage-charging capacitor 36, the resistor 48 is short circuited since the transistor 32 is turned on. The series regulator 40 supplies regulated and filtered direct current to power the receiver 10, taking the relatively small lead portion of each half-cycle of the full sine wave.

The alternate voltage regulator circuitry illustrated in FIG. 2 is the shunt regulator 50 comprising the resistor 52 and the zener diode 46, connected to the receiver 10. The shunt regulator 50 operates to supply regulated and filtered direct current to the receiver 10, as the series voltage regulator 40 does in the circuitry illustrated in FIG. 1. The remaining components of the wiring diagram of FIG. 1 are utilized with the shunt regulator 50 illustrated in FIG. 2, and are the same in substance and organization.

The circuitry illustrated in FIGS. 1 and 2 may optionally include a choke coil or inductance 54 of small or minimum value connected to the anode lead of the rectifier 34, and a capacitor 56, to the purpose described hereinbelow.

When a proper signal of predetermined characteristics is transmitted by a suitable transmitter (not illustrated) and received by the receiver 10 especially adapted to respond to such signal, the receiver causes transistor 32 to be turned off. In such condition, the silicon-controlled rectifier 34 is controlled by the voltage across resistor 48. The operation and performance of the voltage regulator circuit 40 or 50 is such that whenever the power supply voltage to the receiver 10 exceeds the regulating voltage of the zener diode 46, current will flow through diode 46 and hence through resistor 48. Such current flow creates a voltage across resistor 48 which in turn actuates and operates the silicon-controlled rectifier 34.

When the silicon-controlled rectifier is turned on, sufficient current is drawn through the bridge rectifier 30 to activate the operating relay 12. Such performance occurs each half-cycle of rectification. In the next half-cycle the process is repeated, i.e., the radio control receiver 10 first being supplied with sufficient power until the voltage regulator 40 or 50 is satisfied, at which time the silicon-controlled rectifier 34 is again turned on. By this control and power circuitry 8, the operating relay 12 is supplied with nearly all of the alternating current waveform, only a small amount of power at the leading edge being taken off of each half-cycle to power the receiver 10.

When the rectifier 34 is maintained in an "off" condition, and this effect is produced by transistor 32 being "on," the inductance 54 or capacitor 56 have no effect. The purpose of the latter components is to aid the rectifier 34 in turning off each half cycle when it is turned on by the voltage across resistor 48.

Normally open SCR 34 will pass no current to the second output terminal of the bridge rectifier 30 until a voltage appearing at the gate of the SCR closes it. The SCR portion of the circuit is normally of high impedance. The inductance 54 appears to aid the SCR 34 in turning off when no voltage is present at the gate of the SCR. Although neither the inductance 54 nor capacitor 56 are essential to effective functioning of the circuitry herein disclosed, these components assist in smoothing out its functional performance.

Naturally, the values of each of the component elements of the circuitry herein disclosed are subject to variation to obtain the desired functional performance of the circuitry, the determination of these values being considered to be fully within the knowledge and proficiency of persons skilled in the art to which the invention pertains.

Although certain particular embodiments of the invention are herein disclosed for purposes of explanation, further modifications thereof, after study of this specification, will become apparent to those skilled in the art to which the invention pertains. Reference should be had to the appended claims in determining the scope of the invention.

I claim:

1. In a two-wire radio control and power supply system, the combination comprising
   an operating output circuit comprising
      an alternating current low voltage power supply,
      an operating relay connected in series with one side of said power supply,
      and one power terminal connected to said operating relay and a second power terminal connected to the other side of said power supply,
   and a control circuit for said operating relay connected to said two power terminals and comprising
      current rectifying means comprising
         a bridge rectifier connected to said power terminals and a diode, the input terminal of which is connected to a first output terminal of said bridge rectifier,
         a storage capacitor coupling the other terminal of said diode to a second output terminal of said bridge rectifier,
         an SCR coupled between said first and second output terminals of said bridge rectifier,
         a voltage regulator circuit having input, output and reference voltage terminals,
            the input terminal being connected to said other terminal of said diode,
            the output terminal being connected to a radio-controlled receiver adapted to receive and respond to a proper signal of predetermined characteristics,
            and the reference terminal being coupled to said second terminal through a circuit including a transistor responsive to said receiver, and further connected to said SCR for controlling the SCR in response to signals generated by said receiver.

2. The system combination defined in claim 1, and including an electrical operating device connected and responsive to said operating relay.

3. The system combination defined in claim 1, and including manually operable switch means, to open and close said output circuit to said operating relay, connected to and between said two power terminals in said operating output circuit.

* * * * *